Patented June 14, 1938

UNITED STATES PATENT OFFICE 2,120,664

2,4-DINITRO-5-NAPHTHYLAMINO-PHENOLS

Edgar C. Britton, Frank B. Smith, John E. Livak, and Winfield W. Sunderland, Midland, Mich., assignors to The Dow Chemical Company, Midland, Mich., a corporation of Michigan No Drawing. Application March 20, 1937, Serial No. 132,085

4 Claims. (Cl. 260—128)

This invention concerns the 2,4-dinitro-5-arylamino-phenols having the following formula:—

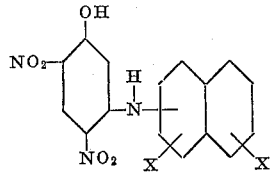

wherein one X represents a lower alkyl radical, chlorine, bromine, or hydrogen, and the other X represents hydrogen.

These compounds are yellow or orange crystalline solids substantially insoluble in water and soluble in most organic solvents. They are particularly useful as insecticides.

In preparing these new compounds, a suitable 1-chloro-2,4-dinitro- 5 - arylamino-benzene compound may be hydrolyzed with sodium acetate. A high boiling inert material such as acetamide may be employed as a reaction solvent if desired. For example, 1 part by weight of a 1-chloro-2,4-dinitro-5-(naphthyl-amino) -benzene, 1 part of sodium acetate, and from 1 to 2 parts of acetamide are mixed together and heated to a fusion temperature with stirring to cause the reaction. The reaction mixture is then cooled, diluted with an excess of water, and the solid phenolic reaction product separated, as by filtration. This crude phenolic product may be employed as obtained for insecticidal purposes or may be purified by known methods.

While any suitable reaction temperature may be employed, we generally prefer to operate at 150° to 180° C. The optimum reaction time is dependent upon the temperature employed, but from one to two hours is generally sufficient to accomplish the hydrolysis. While anhydrous sodium acetate can be employed as a hydrolyzing agent, we have found that sodium acetate trihydrate ($NaC_2H_3O_2 \cdot 3H_2O$) may be advantageously substituted therefor to obtain high yields of the desired phenolic derivatives with a minimum of tar and by-product formation.

The 1-chloro-2,4-dinitro-5-arylamino- benzene compounds employed may be readily prepared by reacting 1,5 - dichloro- 2,4 - dinitro - benzene with a naphthyl-amine or substituted naphthyl-amine or hydrochloride thereof in the presence of sodium acetate trihydrate and in methyl alcohol solution. The reaction is carried out at the refluxing temperature of the reaction mixture, the 1-chloro-2,4-dinitro-arylamino-benzene product precipitating from solution during the reaction. The methyl alcohol is then evaporated from the reaction mixture, and the residue washed with water and recrystallized from an organic solvent to obtain the desired product in sufficiently pure form for use in the preparation of the corresponding phenol derivatives.

The following examples describe the preparation and properties of our new group of compounds but are not to be construed as limiting the invention.

Example 1

A mixture of 5 parts by weight of 1-chloro-2,4-dinitro-5-(betanaphthyl-amino)-benzene, 5 parts of sodium acetate trihydrate, and 10 parts of acetamide was heated to 180° C. for 1.5 hours. The reaction mixture was then cooled to room temperature and digested with 40 parts by weight of water whereby the phenolic product of the reaction was precipitated through the digestion mixture. This precipitate was filtered off, dried with water, dissolved in glacial acetic acid, clarified with bone charcoal, and crystallized. 1.9 parts of substantially pure 2,4-dinitro-5-(betanaphthyl-amino)-phenol was thereby obtained in the form of light orange crystals melting at 183–5° C. (uncorrected).

Example 2

1 - chloro - 2,4 - dinitro - 5 - (alphanaphthyl - amino)-benzene was reacted with sodium acetate trihydrate in the presence of acetamide substantially as described in the foregoing example to obtain 2,4 - dinitro - 5 - (alphanaphthyl-amino)-phenol in the form of yellow needles melting at 197°–198° C. (uncorrected).

In a similar manner 1-chloro-2,4 - dinitro - 5 - naphthylamino-benzene compounds in which the naphthyl-amino group contains an inert substituent in the naphthalene nucleus, e. g. 1-chloro-2,4-dinitro-5-(methyl - naphthyl-amino) - benzene, 1-chloro - 2,4 - dinitro-5-(tertiarybutyl-naphthyl-amino)-benzene, 1-chloro-2,4-dinitro-5-(chloro-naphthyl-amino) - benzene, 1 - chloro-2,4-dinitro-5-(bromo-naphthyl-amino) -benzene, etc., may be hydrolyzed to obtain compounds such as 2,4-dinitro-5-(4-methyl-alphanaphthyl-amino)-phenol, 2,4 - dinitro - 5-(4-tertiarybutyl-alphanaphthyl-amino)-phenol, 2,4-dinitro-5-(3-chloro-betanaphthyl-amino)-phenol, 2,4-dinitro-5-(4-bromo-alphanaphthyl-amino)-phenol, etc.

Representative members of the above-described group of compounds have been tested against Fifth-Instar Silkworms by the Leaf-Sandwich method for the estimation of median lethal dose (Campbell and Filmer, Trans. IV. International Cong. Ent. 523-533 (1929); and Campbell, Jour. Econ. Ent. 23:357-370). For example, the median lethal dose of 2,4-dinitro-5-(alphanaphthyl-amino)-phenol against Fifth-Instar Silkworms was found to be 0.089 milligram per gram of insect body weight, which corresponds exactly with the value obtained for acid lead arsenate (PbHAsO₄). 2,4-dinitro-5-(betanaphthyl-amino)-phenol had a M. L. D. value of 0.104 when tested in a similar manner.

Other modes of applying the principle of our invention may be employed instead of those explained, change being made as regards the materials employed, provided the products described in the following claims be thereby obtained.

We, therefore, particularly point out and distinctly claim as our invention:—

1. A 2,4-dinitro-5-arylamino-phenol having the following formula:

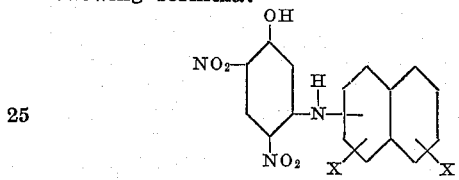

wherein one X represents a substituent selected from the class consisting of hydrogen, chlorine, bromine, and lower alkyl, and the other X represents hydrogen.

2. A 2,4-dinitro-5-(naphthyl-amino)-phenol having the formula:

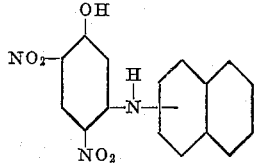

3. 2,4-dinitro-5-(alphanaphthyl-amino)-phenol.

4. 2,4-dinitro-5-(betanaphthyl-amino)-phenol.

EDGAR C. BRITTON.
FRANK B. SMITH.
JOHN E. LIVAK.
WINFIELD W. SUNDERLAND.